United States Patent Office 2,823,230
Patented Feb. 11, 1958

2,823,230

PROCESS FOR PREPARING TEREPHTHALIC ACID

Bernhard Raecke, Dusseldorf, Germany, assignor to Henkel & Cie. G. m. b. H., Dusseldorf-Holthausen, Germany, a corporation of Germany No Drawing. Application August 23, 1956
Serial No. 605,702

Claims priority, application Germany December 5, 1952

21 Claims. (Cl. 260—515)

This invention relates to an improved process of producing terephthalic acid and its derivatives, and more particularly to a process of producing terephthalic acid and its derivatives by using benzoic acid as a starting material.

It is known that salts of terephthalic acid are obtained by heating the sodium salt of benzoic acid until it becomes charred or by fusing the potassium salt of benzoic acid with sodium formate directly over a flame. However, when proceeding in this manner, the yields of terephthalic acid are very small. Furthermore, the non-reacted salts are completely destroyed due to charring.

It is one object of this invention to provide a simple and effective process of producing terephthalic acid by using benzoic acid as starting material, whereby a substantial yield of terephthalic acid is obtained and a considerable amount of unreacted benzoic acid is recovered.

Another object of my invention is to convert benzoic acid into terephthalic acid by subjecting a salt of benzoic acid to heat in a substantially oxygen-free inert atmosphere.

Various other objects and advantages of this invention will become apparent as the description proceeds.

The preferred process of my invention consists in heating monovalent alkali metal salts of benzoic acid under superatmospheric pressure to elevated temperatures in a substantially oxygen-free atmosphere whereby a carboxyl group is introduced in para-position to the carboxyl group present in benzoic acid to produce substantial yields of terephthalic acid. In addition to the potassium, sodium, lithium, rubidium and cesium salts of benzoic acid, reactants which produce potassium, sodium, lithium, rubidium and cesium benzoates during the course of the reaction may also be used. The potassium salts are preferred because of their lower cost and higher yield.

In general, temperatures above 340° C. are required to achieve sufficiently rapid reaction for technical purposes. Moreover, it is necessary to carry out the reaction in the substantial absence of oxygen in order to avoid decomposition of the organic materials at such high temperatures. Traces of oxygen, if present, do not prevent the reaction, but reduce the yields. Preferably the benzoate is heated in an autoclave provided with a stirring device in the presence of carbon dioxide or other inert gas under pressure in excess of atmospheric pressure. Other inert gases such as nitrogen, carbon monoxide, ammonia gas, methane, ethane, propane, benzene and other hydrocarbon gases or mixtures of said gases or other inert gases may be used. The use of carbon dioxide as a protective gas is particularly advantageous. Pressure in excess of 2 atmospheres is also preferred.

The invention in its broader aspect comprises heating the alkali metal salts of aromatic monocarboxylic acids in a substantially oxygen-free inert atmosphere to a temperature above about 340° C. and below the temperature at which substantial decomposition of the starting materials and reaction products takes place, under a pressure sufficient to protect the starting materials from decomposition, to introduce a second alkali metal carboxyl group into said aromatic monocarboxylic salt.

The reaction may be carried out with or without catalysts, however, catalytic metals and metal compounds when used as catalysts produce an increased yield under otherwise identical conditions.

The upper limit of temperature at which the reaction can be carried out is determined by the decomposition temperature of the organic material used and the reaction products. In general, it is not desirable to exceed a temperature of about 500° C., but higher temperatures may be used for short periods if decomposition of the starting materials and reaction products are avoided.

The starting material, such as potassium, sodium, lithium, rubidium or cesium benzoates or materials forming said salts during the reaction, can be used in admixture with inert materials such as, for example, sand, carbon, metal powders, metal shavings, turnings, borings and the like, as well as inert salts such as, for instance, potassium, sodium, rubidium and cesium carbonates, sulfates, chlorides, and the like.

Preferred catalysts are, for example, iron, lead, zinc, mercury, cadmium, and their compounds, such as oxides, organic and inorganic salts, etc., although other metals and compounds may be used. Such compounds as metallic cadmium, cadmium oxide, cadmium iodide, cadmium chloride, cadmium fluoride, cadmium sulfate, cadmium phosphate, cadmium carbonate, cadmium acetate, cadmium soaps, cadmium benzoate, cadmium phthalate, cadmium isophthalate, cadmium terephthalate, metallic zinc, zinc oxide, zinc iodide, zinc chloride, zinc sulfate, zinc phosphate, zinc carbonate, zinc acetate, zinc soaps, zinc benzoate, zinc phthalate, zinc isophthalate, zinc terephthalate, and other metals and compounds may be used as catalysts. The catalysts may be used as such or supported on carriers, and may be recovered from the insoluble residues of the reaction and reused in many instances without further purification.

The amount of catalyst may be up to 15% by weight of the whole reaction mixture. Good results are obtained, however, when using far lower amounts or without the use of any catalyst. The advantageous effects of the use of catalysts are manifested by an increase in yield of the terephthalate salt and, consequently, the terephthalic acid recovered, as well as by an acceleration of the transformation reaction over certain simultaneously occurring side reactions caused by the dissociation of the starting material. As a consequence of the acceleration brought about by the presence of catalysts, it is possible to carry out the transformation reaction at lower temperatures and pressures and even at atmospheric pressure although the use of superatmospheric pressure increases the yield.

The rearrangement reaction of potassium, sodium, lithium, rubidium and cesium benzoates in accordance with my invention results in the formation of a mixed product comprising varying amounts of untransformed benzoate salt and the desired di-salt of terephthalic acid, together with benzene and other reaction products.

Recovery of the terephthalic acid from the reaction mixture is comparatively simple due to the different solubilities of benzoic acid and terephthalic acid in water. In general, the procedure consists in dissolving the reaction mixture in water, filtering off impurities and precipitating the organic acids from the resulting solution by the addition of mineral or organic acids, such as hydrochloric acid, sulfuric acid, benzoic acid, phthalic acid, etc. Unchanged benzoic acid is then extracted with hot water from the resulting acid mixture, leaving terephthalic acid as an insoluble residue. Said terephthalic acid is readily obtained in a pure state by dissolving in alkaline solution, if desired adding adsorbents, for instance, activated charcoal, filtering said solution and reprecipitating terephthalic acid by the addition of mineral or organic acids. The purified terephthalic acid is virtually 100% pure.

Another method of separating the benzoic acid from terephthalic acid is by selective sublimation.

The terephthalate salt as it is obtained by said reaction can also be used directly for producing derivatives of terephthalic acid. For instance, it can be converted into the dichloride or into its esters by the use of methods known in the industry.

The solution of benzoic acid recovered from the reaction mixture can again be used for further reaction to produce terephthalic acid after conversion into potassium, sodium, lithium, rubidium or cesium benzoate. Large amounts of benzene are produced in the course of the reaction of my invention in addition to the carboxylic acids produced.

The salt of benzoic acid required as starting material may be obtained by neutralizing benzoic acid in water with potassium, sodium, lithium, rubidium or cesium hydroxide or the corresponding carbonate, or by any other method which produces benzoate salts of said metals. Such benzoate salt solutions are then converted into the dry state in an especially advantageous manner by spray drying. Thereby fine powders are obtained which have only a very slight moisture content and which are particularly suitable for carrying out the reaction according to my invention. It is, however, also possible to start with reaction mixtures which yield the desired benzoate salt instead of starting with potassium, sodium, lithium, rubidium or cesium benzoate. For example, mixtures of substantially anhydrous benzoic acid and potassium, sodium, lithium, rubidium or cesium carbonate may be used. The reactants need not be present in stoichiometric proportions. If desired, one or the other component may be used in excess.

Other aromatic carboxylic acids can also be subjected to similar reaction according to my invention. For instance, when heating alkali metal salts of aromatic monocarboxylic acids, such as chlorobenzoic acid, toluic acids, naphthalene carboxylic acids, valuable products having more than one carboxylic group are obtained.

The following examples serve to illustrate the invention without, however, limiting the same thereto. The reactions described in these examples were carried out, if not otherwise stated, in autoclaves provided with a stirring device and having a capacity of 1000 to 1500 cc. The stirring device consists of a high-grade steel stirrer. The autoclaves were lined with replaceable high-grade steel linings and were heated by an electric heater.

The alkali metal benzoate serving as starting material in all the examples, unless otherwise stated, was obtained by spray-drying an aqueous solution of said salt in a Krause spray-drying apparatus with hot air having a temperature of 110° C. The powder was kept overnight in a drying oven at 120° C. and was then filled into tightly closed glass bottles or other air-tight containers.

*Example I*

53 gm. of potassium benzoate were mixed with 94 gm. of potassium carbonate and the mixture was heated in an autoclave provided with stirring device to 350° to 354° C. for 6 hours. Heating to said temperature required about 1 hour. Carbon dioxide was introduced under pressure at the beginning of the heating. The initial pressure in the cold was 50 atmospheres' gauge, and the highest pressure reached at the reaction temperature was 102 atmospheres' gauge. After cooling, the salt mixture was dissolved in 200 cc. of hot water. The solution was filtered, whereby dark impurities remained on the filter and the organic acids were precipitated from the filtrate by the addition of dilute hydrochloric acid. The mixture of the resulting acids was filtered on a suction filter and washed with a small amount of cold water. The washed mixture was then boiled with 200 cc. of water and was again filtered by suction. After washing the filter cake with a small amount of boiling water, a white, water-insoluble residue remained on the filter which residue was dried at 120° C. for 14 hours. 7 gm. of a light-colored dicarboxylic acid, which proved to be terephthalic acid, was obtained. Calculated on the assumption that two mols of potassium benzoate undergoes a rearrangement in the reaction to produce one mol of potassium terephthalate and one mol of benzene the yield was 25.4% of the theoretical.

Said acid may be converted by means of phosphorous pentachloride into the dichloride and is then reacted with methanol. The resulting dimethyl ester has a melting point of 139° C. The mixed melting point with pure terephthalic acid dimethyl ester does not show any depression.

On cooling, most of the unreacted benzoic acid crystallizes from the aqueous extract. Said recovered benzoic acid may be again converted into its potassium salt and used again for further conversion into terephthalic acid.

*Example II*

145 gm. of potassium benzoate were treated in an autoclave in the same manner as described in Example I at 400° to 403° C. for 6 hours. Heating to said temperature required about 3 hours. The initial carbon dioxide pressure was 40 atmospheres' gauge and the highest pressure reached during the reaction was 102 atmospheres' gauge. The reaction product had a moist appearance and had a strong benzene odor. The terephthalic acid was recovered from the reaction mixture as described in Example I, whereby 550 cc. of water were used for dissolving the crude product and the same amount for extracting the unreacted benzoic acid from the precipitated terephthalic acid. 28 gm. of crude terephthalic acid, corresponding to a yield of 37.2% calculated on the basis assumed in Example I were obtained. The mixed melting point of the dimethyl ester produced from said terephthalic acid (melting point: 140° C.) with pure terephthalic acid dimethyl ester does not show any depression. Unchanged benzoic acid was recovered from the mother liquors by crystallization.

*Example III*

150 gm. of potassium benzoate having a water content of 0.7% were heated with 75 gm. of potassium carbonate to 450° C. to 455° C. for 6 hours. Heating to said temperature required 4½ hours. At the beginning of this example carbon dioxide was introduced under pressure into the autoclave. The initial pressure in the cold was 50 atmospheres' gauge and the maximum pressure at the reaction temperature was 158 atmospheres' gauge. After cooling, the dark gray reaction product which had a faint odor of benzene, was dissolved in 800 cc. of hot water, and the solution was filtered, whereby 11 gm. of dark-colored impurities remained on the filter. The organic acids were precipitated from the filtrate by the addition of dilute hydrochloric acid, filtered by suction on a suction filter, and washed with a small amount of cold water. The resulting product was boiled with 550 cc. of water and then filtered by suction while still hot. After washing with a small amount of boiling water, a white water-insoluble residue remained which was dried at 110° C. for 48 hours. 41 gm. of a crude acid were obtained, which proved to be terephthalic acid, The yield was 57.2% calculated on the basis of the assumption stated in Example I.

The dimethyl ester produced from said acid in the usual manner and in a good yield, had a melting point of 139° C. No melting point depression was observed by taking a mixed melting point of said ester with pure terephthalic acid dimethyl ester.

Example IV 150 gm. of potassium benzoate were heated with 15 gm. of metallic lead in an autoclave to 400° C. for 6 hours in the manner described in the preceding examples. The initial carbon dioxide pressure was 50 atmospheres' gauge and the maximum pressure 132 atmospheres' gauge. On working up the dark gray crude product having an odor of benzene, 56 gm. of pure terephthalic acid, corresponding to a yield of 72% calculated on the assumption stated in Example I, and 15 gm. of an insoluble filter residue were obtained. No benzoic acid can be recovered when proceeding in this manner.

Example V 150 gm. potassium benzoate and 6 gm. iron oxide ($Fe_2O_3$) were placed into an autoclave. The autoclave was then flushed with carbon dioxide, and thereafter carbon dioxide was introduced into the autoclave until the internal pressure reached 50 atmospheres' gauge. The autoclave and its content were then heated to 400° C. and maintained at that temperature for about 6 hours. The highest pressure reached during that period in the interior of the autoclave was 169 atmospheres' gauge. The autoclave was then permitted to cool to substantially room temperature. A dark gray product, having a strong odor of benzene, was withdrawn from the cooled autoclave and dissolved in 500 cc. water. The resulting solution was heated to boiling and filtered. The filter cake was repeatedly washed with hot dilute sodium hydroxide. The filtrates were collected and combined and the combined solutions were acidified with hydrochloric acid until no further precipitate formed. This precipitate was then filtered off and repeatedly extracted with boiling water. A white, water-insoluble residue remained which was found to be pure terephthalic acid. The yield was 36 gm., which is 53.3% of the theoretical yield calculated on the assumption stated in Example I. 15 gm. of benzoic acid were recovered from the solutions produced by the acid precipitation and the water extraction. The insoluble filter residue amounted to 12 gm.

Example VI 150 gm. potassium benzoate were heated with 15 gm. metallic zinc in an autoclave at 400° C. for 6 hours in an atmosphere of carbon dioxide, as in Example V. Before heating the autoclave and its contents the pressure of carbon dioxide was adjusted to 50 atmospheres' gauge, and the highest pressure reached during the heating step was 140 atmospheres' gauge. The light gray product formed thereby, which had an odor of benzene, was dissolved in water and thereafter treated as in Example V. 48 gm. of terephthalic acid were produced, which corresponds to 66.4% of the theoretical yield calculated on the assumption stated in Example I. The waste solutions yielded 8 gm. benzoic acid and the insoluble filter residue weighed 18 gm.

Example VII 160 gm. potassium benzoate, 69 gm. potassium carbonate and 10 gm. cadmium oxide were heated in a rotary autoclave at 450° C. for 6 hours in an atmosphere of carbon dioxide, as described in Example V. Before heating the autoclave and its contents, the internal pressure of carbon dioxide was adjusted to 50 atmospheres' gauge and the maximum pressure reached during the heating step was 180 atmospheres' gauge. The product produced thereby weighed 201 gm. and had a strong odor of benzene. 90 gm. of this product were dissolved in hot water, the hot solution was filtered, and the filtrate was acidified with hydrochloric acid until no further precipitate formed. The precipitate thus obtained was extracted with hot water, as described in Example V. 30.3 gm. of pure terephthalic acid were obtained thereby, which corresponds to 84.6% of the theoretical yield calculated on the assumption stated in Example I. The waste solutions yielded 2.4 gm. benzoic acid by extraction with ether.

Example VIII 50 gm. potassium benzoate and 1.2 gm. $CdCl_2$ were mixed in a pebble mill for four hours and dried at 150° C. for twelve hours. The mixture was then charged to an autoclave and heated at 440° C. at atmospheric pressure for four hours. Prior to the heating the autoclave was pressure tested with $CO_2$ and the pressure then released by venting the autoclave to the atmosphere. 32.0 gm. of product were recovered from the autoclave. This was dissolved in water and the resulting solution filtered to yield 6.7 gm. of water-insoluble material. From the filtrate 5.1 gm. of terephthalic acid were recovered as well as 2.4 gm. of benzoic acid. The yield of terephthalic acid based on the assumption of Example I was 24%.

Example IX 161 gm. potassium benzoate, 64 gm. potassium carbonate and 10 gm. of cadmium oxide were placed into a rotary autoclave. Thereafter, the interior of the autoclave was flushed with nitrogen and the pressure of nitrogen was adjusted to 10 atmospheres' gauge. Subsequently, the autoclave and its contents were heated to 450° C. and maintained at that temperature for approximately 6 hours. The highest pressure reached in the interior of the autoclave was 50 atmospheres' gauge. The product produced thereby was dissolved in water and subsequently treated as described in Example V. The yield of terephthalic acid was 34.8% of the theoretical yield calculated on the assumption stated in Example I.

Example X

In a rotary autoclave, 40 gm. of potassium p-chlorobenzoate admixed with 1.2 gm. of cadmium fluoride were heated for three hours at 360° C. At the beginning of the run, carbon dioxide was introduced up to a pressure of 50 atmospheres' gauge, and the maximum pressure at 360° C. was 125 atmospheres' gauge.

The reaction product, which weighed 36.4 gm., was dissolved in hot water, purified with activated charcoal, filtered, and the solution was acidified with hydrochloric acid. The precipitated acids were extracted with warm ether; the untransformed p-chlorobenzoic acid went into solution, while 3.8 gm. of 4-chloroisophthalic acid remained behind, which is equal to 18.4% calculated on the assumption stated in Example I.

Example XI 145 gm. sodium benzoate, 53 gm. sodium carbonate and 10 gm. cadmium oxide were placed into a rotary autoclave and heated at 500° C. for 4 hours in an atmosphere of carbon dioxide. Before heating the autoclave and its contents, the pressure of carbon dioxide was adjusted to 50 atmospheres' gauge. The pressure at the end of the run was 235 atmospheres' gauge at a temperature of 500° C. The product produced thereby weighed 175 gm. 100 gm. of this product were dissolved in water and further treated in the manner described in Example V. 8.4 gm. terephthalic acid were obtained, which corresponds to a theoretical yield of 17.6% calculated on the assumption stated in Example I.

Example XII

A mixture comprising 6.7 gm. rubidium benzoate, 2 gm. rubidium carbonate, and 0.4 gm. cadmium fluoride were placed into an autoclave having a net volume of 20 ccm. and heated to 390–400° C. for 5 hours. Before heating the autoclave and its contents, carbon dioxide was pressed into the autoclave, the pressure being adjusted to 40 atmospheres' gauge. The autoclave and its contents were then allowed to cool to substantially room temperature. The grayish black product produced had an odor of benzene. After being dissolved in water it was treated as described in Example V. The yield of pure terephthalic acid was 1.4 gm.=52.2% of theory calculated on the assumption stated in Example I.

Example XIII

A mixture of 100 gm. potassium benzoate and 3 gm. cadmium fluoride was placed into an autoclave made of iron and completely covered by windings for electrical heating. The autoclave was then closed, the air was flushed out with carbon dioxide, and the autoclave was rendered air-tight. Thereafter, the introduction of carbon dioxide was continued until the pressure in the interior reached 10 atmospheres' gauge. The contents of the autoclave was then heated for 2 hours to 440° C. During this time the pressure in the interior of the autoclave was kept constantly at 10 atmospheres' gauge, blowing off the surplus of carbon dioxide and the benzene being formed during the operation. The autoclave and its contents were then permitted to cool to substantially room temperature. 75.7 gm. raw product were thus recovered. After being dissolved in water they were treated as described in Example I. The yield of pure terephthalic acid amounted to 42.6 gm. which represents 82.1% calculated on the assumption stated in Example I.

When using 5.5 gm. cadmium phthalate instead of the 3 gm. cadmium fluoride and proceeding in the same manner as above-described 79.8 gm. raw product containing 42.7 gm. terephthalic acid were recovered. That equals 82.3% of theory calculated as stated above.

When using 7 gm. cadmium benzoate instead of the 3 gm. cadmium fluoride and proceeding in the same manner as above described 77.9 gm. raw product containing 43.6 gm. terephthalic acid were recovered. That equals 84% calculated as stated above.

Example XIV 150 gm. of potassium benzoate were heated with 20 gm. benzene for 6 hours at 400° C. in an autoclave having a volume of 1 liter. The highest pressure reached was 38 atmospheres' gauge. A dark raw product, weighing 104 gm., was obtained. This product was dissolved in water; the solution was acidified with hydrochloric acid. The precipitated aromatic carboxylic acids were repeatedly extracted with boiling water. 28 gm. of terephthalic acid were obtained, which is 36% calculated on the assumption stated in Example I.

Example XV 150 gm. potassium benzoate, together with 20 gm. benzene and 3 gm. cadmium oxide, were heated for 6 hours at 400° C. in a 1-liter autoclave. The maximum pressure reached was 40 atmospheres' gauge. 136 gm. of a dark raw product were obtained, which contained benzene. By dissolving this product in water, precipitating the aromatic acids with hydrochloric acid, and repeated extraction with boiling water, 33 gm.=42.4% of terephthalic acid calculated on the assumption stated in Example I were recovered.

Example XVI 150 gm. potassium benzoate were heated in admixture with 3 gm. of cadmium oxide for 6 hours at 400° C. in a 1-liter autoclave. At the beginning of the experiment, nitrogen was introduced to a pressure of 50 atmospheres' gauge. The maximum pressure developed was 139 atmospheres' gauge. 125 gm. of a gray raw product, which had an odor of benzene, were obtained, and this product was worked up in the same manner as in the preceding Example XIV. 35 gm. of terephthalic acid were obtained=44.8% calculated according to the assumption stated in Example I.

Example XVII 150 gm. potassium benzoate admixed with 3 gm. cadmium oxide were heated for 6 hours at 400° C. in a 1-liter autoclave. At the beginning of the experiment, ammonia gas ($NH_3$) was introduced to a pressure of 7 atmospheres' gauge. The maximum pressure which developed was 41 atmospheres' gauge. A dark product, weighing 93 gm., which had an odor of benzene, was obtained, from which 10.5 gm.=13.5% of terephthalic acid, calculated according to the assumption stated in Example I, were recovered in the manner described in Examples XIII and XIV.

For the sake of simplicity only, the key information is given in the following Examples XVIII and XIX.

Example XVIII

| | |
|---|---|
| Starting material | 150 gm. potassium benzoate without additive. |
| Protective gas | Nitrogen. |
| Starting pressure | 50 atmospheres' gauge. |
| Maximum pressure | 170 atmospheres' gauge. |
| Duration | 6 hours. |
| Temperature | 400° C. |
| Yield of raw product | Dark product, 119 gm., odor of benzene. |
| Pure yield | 21 gm. terephthalic acid=27%. |

Example XIX

| | |
|---|---|
| Starting material | 162 gm. potassium benzoate with 20 gm. benzene as additive. |
| Catalyst | 10 gm. cadmium fluoride. |
| Protective gas | Carbon dioxide. |
| Starting pressure | 50 atmospheres' gauge. |
| Maximum pressure | 158 atmospheres' gauge. |
| Duration | 6 hours. |
| Temperature | 400° C. |
| Raw yield | 175 gm. |
| Pure yield | 55 gm. terephthalic acid=65.4%. |

Example XX 4 gm. benzoic acid were dissolved with 4 gm. rubidium carbonate in a small amount of hot water. The solution was evaporated to dryness and the rubidium benzoate was dried at 130° C. The salt thus obtained was admixed with 2 gm. of rubidium carbonate and heated for 6 hours at 400° C. in an autoclave having a volume of 20 cc. At the beginning of the experiment, carbon dioxide was introduced to a pressure of 47 atmospheres' gauge.

After cooling, the black reaction product was dissolved in 20 cc. boiling water, filtered, and the organic acids were then precipitated with dilute hydrochloric acid from the filtrate. These acids were repeatedly extracted with 20 cc. of hot water. 1.27 gm. of terephthalic acid, insoluble in water, were obtained giving a yield equal to 46.8% calculated on the assumption stated in Example I.

Example XXI 45 gm. benzoic acid anhydride, 15 gm. lithium carbonate and 2 gm. cadmium fluoride were intimately admixed and the mixture was heated in an autoclave for six hours at 400–410° C. Before the commencement of the run, carbon dioxide was introduced to a pressure of 50 atmospheres' gauge. The maximum pressure was about 300 atmospheres' gauge. The reaction product was worked up in the usual manner. The yield amounted to 2.5 gm. terephthalic acid =7.6%.

Example XXII

An intimate mixture of 50 gm. potassium benzoate, 100 gm. lithium carbonate and 2 gm. cadmium fluoride was heated in an autoclave for six hours at 400° C. At the beginning of the run carbon dioxide was introduced to a pressure of 50 atmospheres' gauge. The reaction product was worked up in the usual manner and resulted in a yield of 12.2 gm. terephthalic acid =47%.

Example XXIII 30 gm. cesium benzoate were heated in an autoclave at a constant carbon dioxide pressure of 10 atmospheres' gauge for four hours at 420° C. Subsequently, the reaction product was worked up in the usual manner. The yield amounted to 5.6 gm. terephthalic acid =64.7%. By extraction with ether, 1.7 gm. of the benzoic acid used as the starting material were recovered from the mother liquor.

Example XXIV 30 gm. cesium benzoate admixed with 0.5 gm. cadmium fluoride were heated in an autoclave at a constant carbon dioxide pressure of 10 atmospheres' gauge for five hours at 380° C. The reaction product was worked up in the usual manner and yielded 8.9 gm. terephthalic acid =90.8%.

Example XXV

A mixture of 20 gm. cesium benzoate, 10.8 gm. potassium carbonate and 0.5 gm. cadmium fluoride was heated for five hours at 340° C. in a rotary autoclave having a net volume of 0.2 liter. At the beginning of the run carbon dioxide was introduced to a pressure of 50 atmospheres' gauge. The maximum pressure amounted to 110 atmospheres' gauge. The reaction product was worked up in the usual manner. 8.2 gm. of the benzoic acid used as the starting material were recovered. The yield of terephthalic acid was 0.8 gm., which corresponds to 83.8%, taking into consideration the recovered benzoic acid.

This application is a continuation-in-part of my copending application Serial Number 395,609, filed December 1, 1953, and contains some examples from a copending joint application Serial Number 472,246, filed November 30, 1954, now Patent No. 2,794,830.

While I have described and given illustrative examples of various ways of practicing the process of my invention, it will be understood that the said examples are by no means exhaustive but are merely illustrative of various ways of practicing the process and that various modifications and changes from the examples given, other reactants and other reaction conditions may be used within the spirit of my invention and scope of the following claims.

Any reaction theories expressed or implied herein are given solely for the purpose of explanation without intending to be bound thereby.

I claim:

1. In a process of producing aromatic monocyclic dicarboxylic acids from aromatic monocyclic monocarboxylic acids, the steps comprising converting said monocyclic monocarboxylic acids into salts of the group consisting of the alkali metal salts thereof, and heating said salts in a substantially oxygen-free inert atmosphere to a temperature above about 340° C. and below the temperature at which substantial decomposition of the starting materials and reaction products takes place to introduce a second carboxyl salt group into said monocyclic monocarboxylic acid salts.

2. In a process of producing aromatic monocyclic dicarboxylic acids from aromatic monocyclic monocarboxylic acids, the steps comprising converting said monocyclic monocarboxylic acids into salts of the group consisting of the alkali metal salts thereof, and heating said salts in a substantially oxygen-free inert atmosphere containing carbon dioxide to a temperature above about 340° C. and below the temperature at which substantial decomposition of the starting materials and reaction products takes place to introduce a second carboxyl salt group into said monocyclic monocarboxylic acid salts.

3. In a process of producing aromatic monocyclic dicarboxylic acids from aromatic monocyclic monocarboxylic acids, the steps comprising converting said aromatic monocyclic monocarboxylic acids into substantially dry alkali metal salts thereof, heating said substantially dry salts in a substantially oxygen-free inert atmosphere to a temperature above about 340° C. and below the temperature at which substantial decomposition of the starting materials and reaction products takes place until a substantial amount of the corresponding disalts of the monocyclic dicarboxylic acid has been formed, dissolving said salts in water, converting said salts into the corresponding acids thereof and separating the monocyclic dicarboxylic acids from said solution.

4. In a process of producing salts of terephthalic acid, the step comprising heating an alkali metal salt of benzoic acid in a substantially oxygen-free inert atmosphere to temperatures above about 340° C. and below the temperature at which substantial decomposition of the starting materials and reaction products takes place to introduce a second carboxyl salt group into said benzoic acid salt.

5. In a process of producing salts of aromatic monocyclic dicarboxylic acids, the step comprising heating an alkali salt of an aromatic monocyclic monocarboxylic acid in a substantially oxygen-free inert atmosphere and in the presence of inert materials to a temperature above 340° C. and below the decomposition temperature of said starting material and reaction products to introduce a second carboxyl salt group into said monocyclic monocarboxylic acid salt.

6. In a process of producing salts of terephthalic acid, the step comprising heating an alkali metal of benzoic acid in a substantially oxygen-free inert atmosphere containing carbon dioxide under superatmospheric pressure and in the presence of inert materials to a temperature above 340° C. and below the decomposition temperature of said starting material to introduce a second carboxyl salt group into said benzoic acid salt.

7. The method of producing terephthalic acid from benzoic acid which comprises converting the benzoic acid into an alkali metal salt thereof, and heating the said salt under superatmospheric pressure in excess of two atmospheres in a substantially oxygen-free inert atmosphere to a temperature between about 340° C. and 500° C. until a substantial amount of the corresponding salt of terephthalic acid has been produced.

8. The method of producing terephthalic acid from benzoic acid which comprises converting the benzoic acid into an alkali metal salt thereof, heating the said salt under superatmospheric pressure in a substantially oxygen-free inert atmosphere to a temperature between about 340° C. and 500° C. until a substantial amount of the corresponding salt of terephthalic acid has been produced, converting said terephthalic acid salt into terephthalic acid, and separating said terephthalic acid from the remainder of the reaction mixture.

9. The method of producing terephthalic acid from benzoic acid which comprises converting the benzoic acid into an alkali metal salt thereof, heating the said salt under superatmospheric pressure in excess of two atmospheres in a substantially oxygen-free inert atmosphere to a temperature between about 340° C. and 500° C. until a substantial amount of the corresponding salt of terephthalic acid has been produced, dissolving the reaction mixture in water, separating the insoluble residue, acidifying the water solution to precipitate the terephthalic acid therefrom, and separating the insoluble terephthalic acid from the water-soluble acids.

10. The method of producing aromatic monocyclic dicarboxylic acids from aromatic monocyclic monocarboxylic acids which comprises subjecting the aromatic monocyclic monocarboxylic acids to heat above 340° C. and below the decomposition temperature of said starting material and reaction products and pressure above 2 atmospheres' gauge in a substantially oxygen-free inert atmosphere and in the presence of an alkali metal carbonate until a second carboxyl group has been introduced into the aromatic nucleus.

11. The method of producing aromatic monocyclic dicarboxylic acids from aromatic monocyclic monocarboxylic acids which comprises subjecting the aromatic monocyclic monocarboxylic acids to heat above 340° C. and below the decomposition temperature of said starting material and reaction products and pressure above 2 atmospheres' gauge in a substantially oxygen-free inert atmosphere and in the presence of a material which forms an alkali metal salt of said aromatic monocyclic monocarboxylic acids under the reaction conditions until a second carboxyl group has been introduced into the aromatic nucleus.

12. The method of producing an alkali metal terephthalate from an alkali metal benzoate which comprises subjecting said alkali metal benzoate to heat above 340° C. and below the decomposition temperature of said starting material and reaction products and pressure above 2 atmospheres' gauge in a substantially oxygen-free inert atmosphere of carbon dioxide and in the presence of an alkali metal salt until a second carboxyl group has been introduced into said benzoic acid salt.

13. The method of producing aromatic monocyclic dicarboxylic acids from aromatic monocyclic monocarboxylic acids which comprises converting said aromatic monocyclic monocarboxylic acids into alkali metal salts thereof, heating said salts in a substantially dry state and in a substantially oxygen-free inert atmosphere to a temperature between about 340° C. and not substantially above 500° C. until a substantial amount of disalts of aromatic monocyclic dicarboxylic acids has been produced, converting said disalts of the dicarboxylic acids and the salts of the monocarboxylic acids into the corresponding acids and separating the dicarboxylic acids from the monocarboxylic acids.

14. The method of producing terephthalic acid from benzoic acid which comprises converting the benzoic acid into an alkali metal salt thereof, drying the said benzoate salt and heating the dry benzoate salt in an inert atmosphere substantially free of oxygen under a pressure in excess of two atmospheres to a temperature between about 340° C. and below the decomposition temperature of said benzoate salt until a substantial amount of a disalt of terephthalic acid has been produced and converting the disalt of terephthalic acid into terephthalic acid and separating the terephthalic acid from the remainder of the reaction mixture.

15. The method of producing terephthalic acid from benzoic acid which comprises converting the benzoic acid into an alkali metal salt, thereof drying the said benzoate salt and heating the dry benzoate salt in an inert atmosphere substantially free of oxygen under a pressure in excess of two atmospheres and containing carbon dioxide, to a temperature between about 340° C. and below the decomposition temperature of said benzoate salt until a substantial amount of a disalt of terephthalic acid has been produced and converting the disalt of terephthalic acid into terephthalic acid and separating the terephthalic acid from the remainder of the reaction mixture.

16. In a process for producing salts of aromatic monocyclic dicarboxylic acids, the step comprising heating an alkali metal salt of an aromatic monocyclic monocarboxylic acid in a substantially oxygen-free inert atmosphere under a pressure in excess of two atmospheres to a temperature above about 340° C. and below the temperature at which substantial decomposition of the starting materials takes place to introduce a second carboxyl salt group into said monocyclic monocarboxylic acid salt.

17. In a process for producing salts of terephthalic acid, the step comprising heating an alkali metal salt of a benzoic acid in a substantially oxygen-free inert atmosphere under a pressure in excess of two atmospheres to a temperature above about 340° C. and below the temperature at which substantial decomposition of the starting materials takes place to introduce a second carboxyl salt group into said salt of benzoic acid.

18. The method of claim 7 in which the salt is lithium benzoate.

19. The method of claim 7 in which the salt is rubidium benzoate.

20. The method of claim 7 in which the salt is cesium benzoate.

21. The method of claim 7 in which the salt is sodium benzoate.

No references cited.

U. S. DEPARTMENT OF COMMERCE
PATENT OFFICE
CERTIFICATE OF CORRECTION

Patent No. 2,823,230 February 11, 1958

Bernhard Raecke

It is hereby certified that error appears in the printed specification of the above numbered patent requiring correction and that the said Letters Patent should read as corrected below.

Columns 3, 4, and 5, Examples I through VII, and columns, 6, 7, 8 and 9, Examples IX through XXV, for the term "atmospheres' gauge", wherever it appears, read -- atmospheres gauge --; column 10, line 11, after "alkali" insert -- metal --; line 19, after "metal" insert -- salt --.

Signed and sealed this 20th day of May 1958.

(SEAL)
Attest:
KARL H. AXLINE
Attesting Officer

ROBERT C. WATSON
Commissioner of Patents